A. BURKHOLDER.
GUARD-FINGER FOR HARVESTER.
No. 174,350. Patented March 7, 1876.
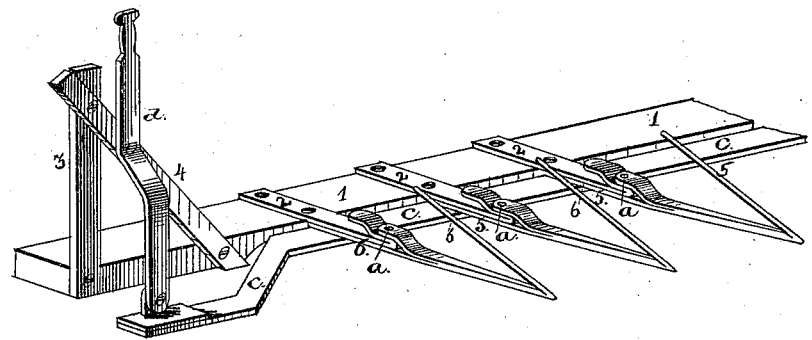
Attest:
David Knee
F. G. Phillips
Inventor:
Albert Burkholder

UNITED STATES PATENT OFFICE.

ALBERT BURKHOLDER, OF CLARKSVILLE, IOWA.

IMPROVEMENT IN GUARD-FINGERS FOR HARVESTERS.

Specification forming part of Letters Patent No. 174,350, dated March 7, 1876; application filed August 14, 1875.

*To all whom it may concern:*

Be it known that I, ALBERT BURKHOLDER, of Clarksville, in the county of Butler and State of Iowa, have invented a new and useful improvement in devices for lifting and straightening up lodged grain and enabling the reel to catch and bring it straight onto the platform or belt of the harvesting-machine, of which the following is a full, clear, and exact description, reference being had therein to the accompanying drawing, in which the figure shown is a perspective view of so much of the finger-bar of a harvester, having the fingers attached thereto, as is necessary to the understanding of the nature of my invention.

To a suitable finger-bar 1 I attach, by means of screws, rivets, or other suitable means, a series of fingers, 2 2, adapted to project beyond the line of the knives and to receive them and allow their free reciprocation. To the front end of each finger 2, and in front of the line of the knives, I secure a supplementary finger or guard-point, 5, which is connected to the guard-finger proper by means of a vertical pivot, *a*, which permits the lateral movement of the guard-points. The space between the guard-fingers is thus left continually clear for the admission of the grain. The lower and rear portion 6 of the guard-points forms a shank passing to the rear of the pivot *a*. This shank 6 is or may be pivoted to a bar, *c*, connected in the same manner with the whole series of guard-points 5 5 5. The entire series may thus be moved or adjusted from the same bar, *c*, which is itself moved from a lever, *d*, pivoted to a bar or brace, 4, secured to the finger-bar *i* and upright 3. I do not, however, confine myself to this or any particular form of adjustment for imparting motion.

I am aware of the existence of older devices for the same general purpose of lifting the fallen or lodged grain to a position in which it can be cut, and I moreover disclaim the broad idea of a laterally-adjustable grain-lifter, pivoted in front of the line of cutters, as old and not of my invention; but What I do claim, and desire to secure by Letters Patent, is—

The combination, with the guard-fingers, of the guard-points severally pivoted to the front end thereof, leaving the space between said guard-fingers continually open during the operation of the machine, substantially as described.

ALBERT BURKHOLDER.

Witnesses:
JOHN PALMER,
R. E. WITT.